United States Patent
Murakami et al.

[11] Patent Number: 5,456,980
[45] Date of Patent: Oct. 10, 1995

[54] AMMONIUM CARBOXYLATE LUBRICANT AND MAGNETIC RECORDING MEDIUM USING THE SAME

[75] Inventors: Yuko Murakami, Ibaraki; Takayuki Nakakawaji, Hitachi; Mitsuyoshi Shoji; Juichi Arai, both of Ibaraki; Yutaka Ito, Takahagi, all of Japan

[73] Assignee: Hitachi, Ltd., Tokyo, Japan

[21] Appl. No.: 203,368

[22] Filed: Mar. 1, 1994

[30] Foreign Application Priority Data

Mar. 1, 1993 [JP] Japan .................. 5-039659

[51] Int. Cl.⁶ .......................................... G11B 5/00
[52] U.S. Cl. ............... 428/336; 428/408; 428/421; 428/694 TF; 428/694 TP; 428/694 TC; 428/900; 252/54; 252/58; 252/62.54
[58] Field of Search ............... 428/694 TF, 421, 428/694 TP, 694 TC, 408, 336, 900; 252/62.54, 58, 54

[56] References Cited

U.S. PATENT DOCUMENTS

| | | | |
|---|---|---|---|
| 4,912,252 | 3/1990 | Dekura et al. | 560/140 |
| 5,091,269 | 2/1992 | Kondo et al. | 428/695 |
| 5,128,216 | 7/1992 | Ng | 428/695 |

Primary Examiner—Stevan A. Resan
Attorney, Agent, or Firm—Antonelli, Terry, Stout & Kraus

[57] ABSTRACT

A lubricant comprising a multifunctional ammonium carboxylate represented by the general formula (1) and a magnetic recording medium comprising a non-magnetic support having a magnetic layer thereon, on the top of which a protective film is formed, wherein the lubricant is coated on the medium to form a lubricant film.

$$(Rf-COO^-)_n(H-\overset{R^1}{\underset{R^2}{N^+}})_n-R \qquad (1)$$

where n is an integer of 2 to 4, Rf represents a non-branched, linear perfluoropolyether chain having an average molecular weight of 3000 to 10000, $R^1$ and $R^2$ represent hydrogen or an alkyl group, and R represents an organic group of two to four valences having one or more aromatic rings.

14 Claims, 1 Drawing Sheet

AMMONIUM CARBOXYLATE LUBRICANT AND MAGNETIC RECORDING MEDIUM USING THE SAME

BACKGROUND OF THE INVENTION

1. Field of the Invention

The present invention relates to a fluorine-containing lubricant and a magnetic recording medium coated with the same having a low coefficient of friction and an excellent durability.

2. Description of the Related Art

An attempt has been made heretofore to coat various lubricants on the surfaces of magnetic recording media in order to prevent abrasion, disruption, adsorption, and the like caused due to contact with or slidably moving on magnetic heads. Such lubricants include fluorine-containing lubricants such as perfluoroalkyl compounds, perfluoropolyoxyalkyl or perfluoropolyoxyalkylene compounds and the like as well as higher fatty acids and esters thereof.

Generally, fluorinated compounds have been used as agents preventing the contamination on the surfaces of solids, or as water- and oil-repellents on the surfaces of solids because the fluorinated compounds are lower in surface energy and chemically inert.

In recent years, magnetic recording media have been required to move on magnetic heads under increasingly severe sliding conditions and hence lubricants have been required to have higher lubricating properties as the magnetic recording media have been provided with a higher level of recording densities. That is, the lubricants have been required to be capable of forming into thinner film and more excellent in durability under sliding conditions, in hydrophobic and oleophobic properties over an extended period of time as well as in stable durability under a wide variety of environmental conditions. However, it is very difficult to satisfy these requirements. In the case of perfluoroalkyl lubricants, for example, they are poor in lubricating properties owing to short fluorinated carbon chain, though they are excellent in hydrophobic and oleophobic properties. On the other hand, in the case of perfluoropolyoxyalkyl or perfluoropolyoxyalkylene lubricants, they are poor in adsorption property owing to longer fluorinated carbon chain, though they are good in lubricating properties. A number of propositions have been made to improve the adsorption property of the lubricants as disclosed in Japanese Patent KOKAI (Laid-open) No. Sho 64-9961, Japanese Patent KOKAI (Laid-open) No. Hei 4-95217, Japanese Patent KOKAI (Laid-open) No. Hei 3-222114, Japanese Patent KOKAI (Laid-open) No. Sho 63-258992, where lubricants having polar groups are disclosed.

Although the lubricants for magnetic recording media have been required to have stringent proparties as described above, none of conventional lubricants has satisfied such severe conditions yet. Japanese Patent KOKAI (Laid-open) No. Sho 64-9961 discloses that fluorinated lubricants with amine salts of perfluoroalkyl carboxylic acids can be effectively used under various conditions. However, the proposed lubricants can not be said sufficient in lubricating property because of short fluorinated carbon chain. Since magnetic disk apparatuses may be at temperatures from 50° to 60° C. inside thereof during operation, the lubricants must specifically have a lower evaporating property and a lower volatility in order to achieve a high reliability in running properties.

SUMMARY OF THE INVENTION

An object of the present invention is to provide a lubricant containing a novel fluorinated compound having a lower evaporating property and a lower volatility as well as a lubricating effect over an extended period of time.

Another object of the present invention is to provide a magnetic recording medium having an excellent durability in sliding movement by applying the aforementioned lubricant.

The present invention lies in a lubricant containing a multifunctional ammonium carboxylate which comprises two or four polyether perfluoride chains bonded to an ammonium salt of a carboxylic acid having one or more aromatic rings as well as in a magnetic recording medium having lubricant films formed by applying the lubricant, and the gist of the present invention is as follows.

(1) The general formula (1):

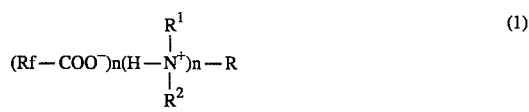

(where n is an integer of 2 to 4, Rf represents a perfluoropolyether chain having an average molecular weight of 3000 to 10000, $R^1$ and $R^2$ represent hydrogen or an alkyl group, R represents an organic group of two to four valences having one or more aromatic rings.), by which a lubricant characterized by containing a multifunctional ammonium carboxylate represented.

(2) The magnetic recording medium characterized by comprising a non-magnetic support having a magnetic layer thereon, on the top of which a protective film is formed, characterized in that a lubricant film containing a multifunctional ammonium carboxylate represented by the general formula (1) is formed on said protective film.

The multifunctional ammonium carboxylate represented by the general formula (1) may be synthesized with a perfluorinated polyethercarboxylic acid represented by Rf—COOH and an amine represented by the general formula (6):

When n is 2, it is synthesized with two molecules of the perfluorinated polyethercarboxylic acid and one molecule of the amine. When n is 3, it is synthesized with three molecules of the perfluorinated polyethercarboxylic acid and one molecule of the amine. When n is 4, it is synthesized with four molecules of the perfluorinated polyethercarboxylic acid and one molecule of the amine.

In the above general formula (1), $R^1$ and $R^2$ represent hydrogen or an alkyl group. The preferred alkyl group is methyl or ethyl. The R should be an organic group of two to four valences containing one or more aromatic rings in order to achieve a sufficient adsorptive capacity.

In the above general formula (1), the Rf should be:
desirably a non-branched linear perfluoropolyether chain expressed by

where m is an integer. Practical average molecular weight ranges from 3000 to 10000, and if it is lower than 3000, insufficient resistance to evaporation and volatilization while if it is higher than 10000, sticking on the magnetic head is liable to take place.

Non-limiting practical examples of the multifunctional ammonium carboxylates of the present invention are described under:

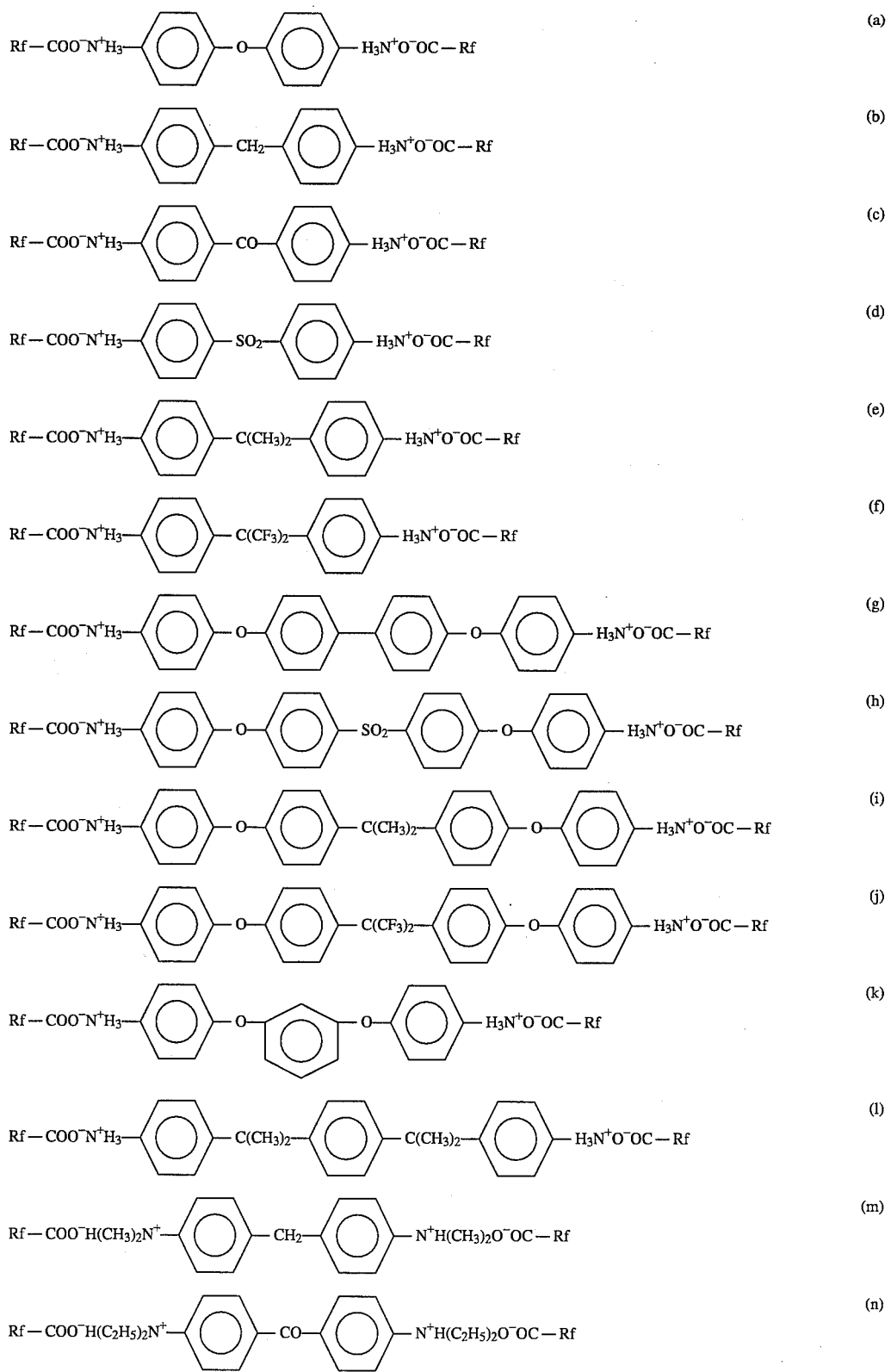

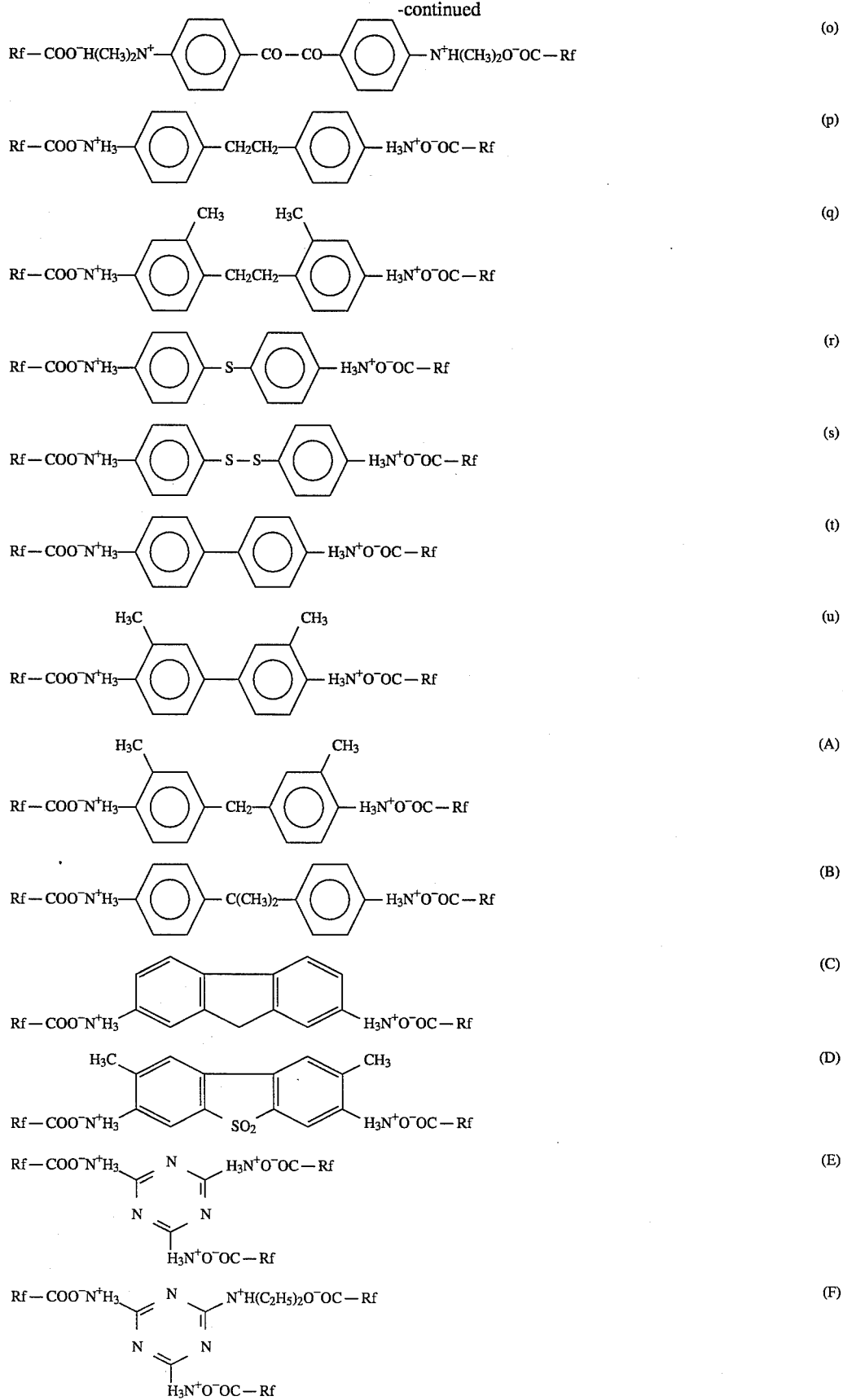

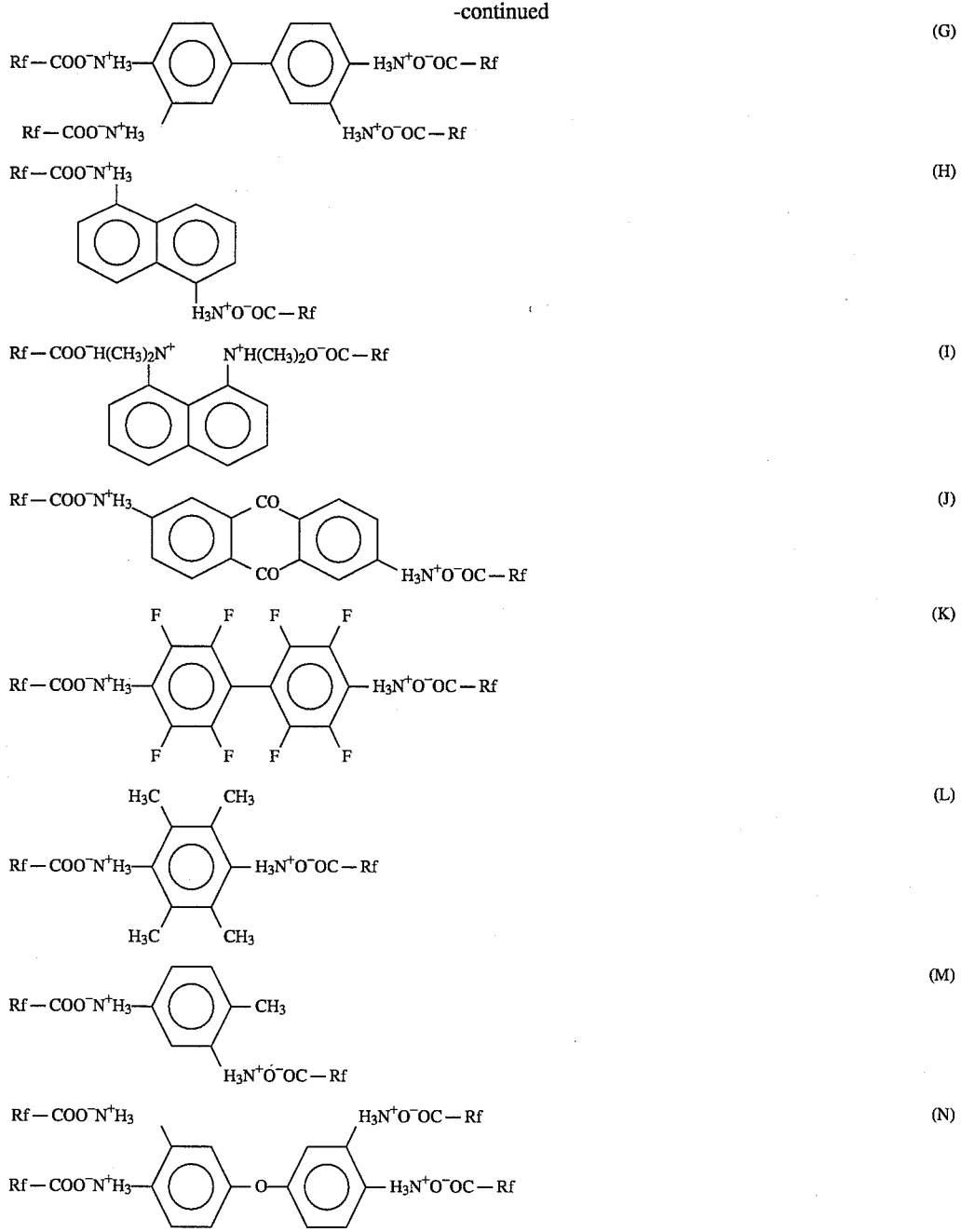

The multifunctional ammonium carboxylates of the present invention have a multi-chain structure where two to four perfluoropolyether chains are bonded so that it is easy to increase the molecular weight without increasing the length of the perfluoropolyether. Therefore, they have a lower coefficient of friction, a lower volatility, and a reduced evaporating property.

They can firmly be adsorbed on the carbon protective film of the magnetic recording medium because the ammonium carboxylate group is highly polarized. It may be speculated that the π electrons on the aromatic ring bonded to the ammonium carboxylate group interact with the carbon film to enhance the adsorptive strength. And the perfluoropolyether covering the top surfaces of magnetic recording medium reduces the surface energy to give excellent hydrophobic and oleophobic properties and lubricity. It is considered therefor that the magnetic recording medium is excellent in resistance to abrasion, sliding durability and has a higher reliability.

BRIEF DESCRIPTION OF THE PREFERRED EMBODIMENTS

The present invention will be described more practically with reference to Examples without being limited thereto.

EXAMPLE 1

14.0 grams of DEMNUM SH-2 (molecular weight: 3500) as expressed by the formula below available from Daikin Co. were dissolved in 80 ml of trifluorotrichloroethane and sufficiently agitated.

$$F(CF_2CF_2CF_2-O)n-CF_2CF_2-COOH \quad (7)$$

To this solution there was added 0.4 gram of 4,4'-diaminodiphenylether and sufficient agitation was continued for about 24 hours. After leaving to stand, a white precipitate was settled, the supernatant was removed, and nitrogen gas was bubbled. Then the solvent was removed under a reduced pressure with a hydraulic suction pump to yield a pale-brown viscous liquid multifunctional ammonium carboxylate having the following structure (Synthetic 1):

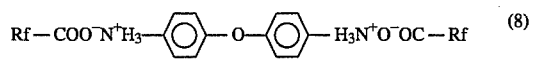

where Rf is $F(C_3F_6O)n-C_2F_4-$.

Figure 1:
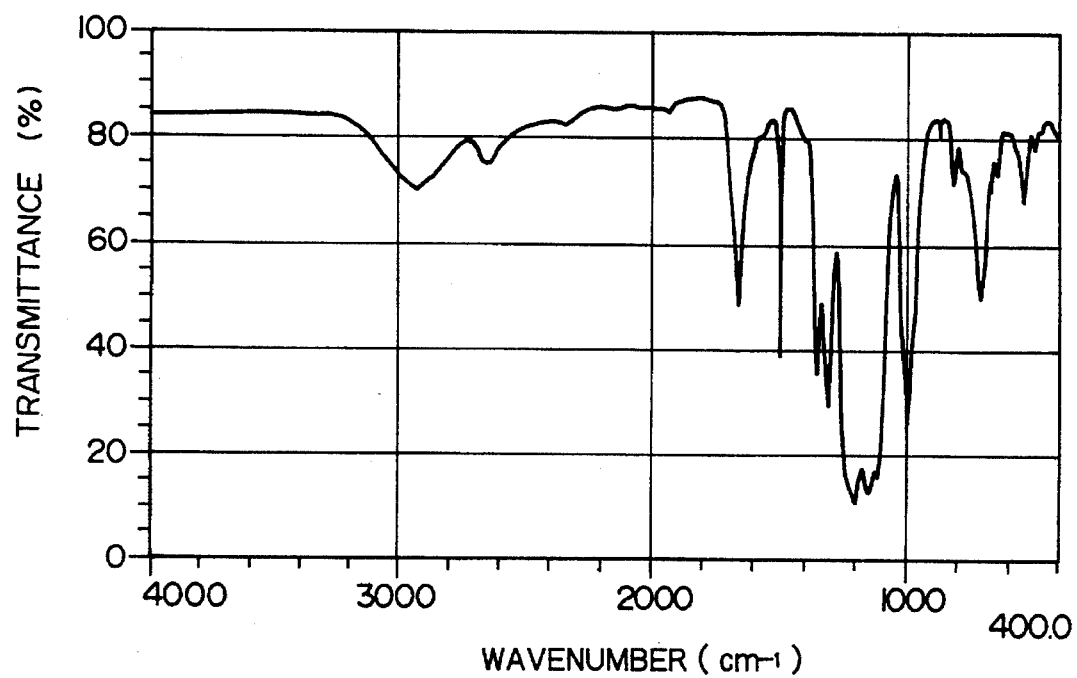
FIG. 1 is the infrared absorption spectral pattern of Synthetic 1 of the present invention.

FIG. 1 shows the infrared spectral pattern of the multifunctional ammonium carboxylate as described above. There are observed absorptions at 3300 to 2750 cm$^{-1}$ owing to the ammonium salt. Moreover, the stretching vibration of the carboxylic acid was shifted to 1670 cm$^{-1}$ identifying the chemical structure of the Synthetic 1.

According to the synthesis example as described above, multifunctional ammonium carboxylates as shown in Table 1 were synthesized. The amines used were 4,4'-diaminodiphenylmethane (synthetic 2), 4,4'-diaminobenzophenone (Synthetic 3), 2,2-bis(4-aminophenyl)hexafluoropropane (Synthetic 4), 1,4-bis(4-aminophenoxy)benzene (Synthetic 5), 1,5-diaminonaphthalene (Synthetic 6), 2,6-diaminoanthraquinone (Synthetic 7), melamine (Synthetic 8), and 3,3'-diaminobenzidine (Synthetic 9). The Synthetics 2 to 9 were also identified by infrared spectral analysis to have the multifunctional ammonium carboxylate structure.

TABLE 1

| Synthetics | Structural Formula |
|---|---|
| 1 | Rf—COO⁻N⁺H₃—⟨⟩—O—⟨⟩—H₃N⁺O⁻OC—Rf (a) |
| 2 | Rf—COO⁻N⁺H₃—⟨⟩—CH₂—⟨⟩—H₃N⁺O⁻OC—Rf (b) |
| 3 | Rf—COO⁻N⁺H₃—⟨⟩—CO—⟨⟩—H₃N⁺O⁻OC—Rf (c) |
| 4 | Rf—COO⁻N⁺H₃—⟨⟩—C(CF₃)₂—⟨⟩—H₃N⁺O⁻OC—Rf (f) |
| 5 | Rf—COO⁻N⁺H₃—⟨⟩—O—⟨⟩—O—⟨⟩—H₃N⁺O⁻OC—Rf (N) |
| 6 | Rf—COO⁻N⁺H₃—(naphthalene)—H₃N⁺O⁻OC—Rf (H) |
| 7 | Rf—COO⁻N⁺H₃—(anthraquinone with 2 CO)—H₃N⁺O⁻OC—Rf (J) |
| 8 | Rf—COO⁻N⁺H₃—(triazine)—H₃N⁺O⁻OC—Rf, H₃N⁺O⁻OC—Rf (E) |

TABLE 1-continued

| Synthetics | Structural Formula |
|---|---|
| 9 | 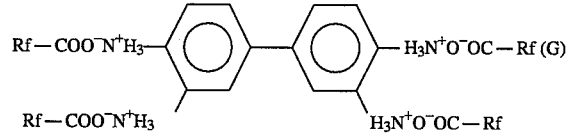 |

EXAMPLE 2

Figure 2:
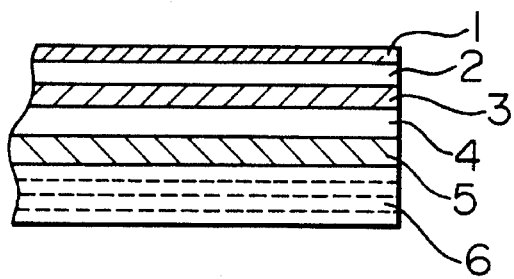
FIG. 2 is the schematic partially cross-sectional view of and embodiment of the magnetic recording medium according to the present invention.

The Synthetic 1 was coated on a magnetic recording medium to evaluate the performance as lubricant. FIG. 2 is a partly enlarged cross-sectional view of an embodiment of the magnetic recording medium according to the present invention.

A magnetic recording medium were produced by the following steps. Initially an Al alloy substrate 6 of 5.25 inches was coated on its surface with a hard prime layer 5, i.e., Ni—P layer and a Cr layer 4 thereon, on the top of which a Co magnetic film 3 was sputtered and further a carbon protective film 2 was formed to prepare a disk. Then the Synthetic 1 was dissolved in FLUORINERT FC3252 in a predetermined concentration to produce a solution, into which the above disk was immersed to form a fluorine-containing lubricant film 1. The lubricant film had a thickness of 15±2 nm. Coating was effected under the conditions of an immersing velocity of 10 mm/sec., a retention time of 180 sec., and a drawing up speed of 2.5 mm/sec.

First, the lubricant film was evaluated for the adsorption ability onto the carbon film as expressed by evaporating property and volatility. That is, the loss of the lubricant film due to heating was measured as a rate of reduction in film thickness. As a result, it has been found that the lubricant film has an extremely small rate of reduction in thickness of less than 10% in an atmosphere at 120° C. even after 700 hours.

Next, the lubricant film was evaluated for initial adhesiveness. The adhesiveness was determined by means of CSS (Contact Start and Stop) tester available from ONODA CEMENT Co., Ltd. The lubricant film was measured for the coefficient of dynamic friction was measured by sliding the disk at a low speed under a head loading of 10 grams, and found to have a small coefficient of dynamic friction of 0.23 even when the thickness of the lubricant film was 15 nm or more. Moreover, the lubricant film was evaluated for lubricating ability by measuring the frictional force at 1 rpm after conducting CSS of 3000 cycles by means of the CSS tester, and found to have a small value of 26.5 mN at maximum without crashing even after 10000 cycles.

The Synthetics 2 to 9 were subjected to the identical evaluation test, and the results are shown in Table 2.

TABLE 2

| Synthetics | Volatility and evaluating property* (%) | Coefficient of dynamic friction** | Durability to CSS cycles (mN) |
|---|---|---|---|
| Example 1 | <10 | 0.23 | 26.5 |
| Example 2 | <10 | 0.26 | 27.4 |
| Example 3 | <10 | 0.24 | 28.4 |
| Example 4 | <10 | 0.27 | 29.4 |
| Example 5 | <10 | 0.26 | 27.4 |
| Example 6 | <10 | 0.24 | 26.5 |
| Example 7 | <10 | 0.25 | 28.4 |
| Example 8 | <10 | 0.24 | 29.4 |
| Example 9 | <10 | 0.24 | 28.4 |
| Comp.Ex. 1 | 65 | 0.94 | 127.4 |
| Comp.Ex. 2 | 75 | 1.25 | 122.5 |
| Comp.Ex. 3 | 40 | 0.51 | 81.3 |
| Comp.Ex. 4 | 35 | 0.51 | 98.1 |

*The amount of the lubricant evaluated and volatilized at 120° C. for 700 hours.
**The frictional force at 1 rpm after 3000 cycles of CSS.

Comparative Example 1

The disks were coated with the fluorine-containing compound as described below and subjected to the identical evaluation test to that in Example 2.

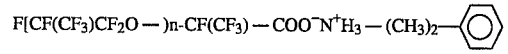

[9]

Comparative Example 2

The disks were coated with the ammonium carboxylate having no aromatic ring of the structure as described below and subjected to the identical evaluation to that in Example 2.

$$C_8F_{17}COO^-N^+H_4 \quad (10)$$

Comparative Example 3

The disks were coated with the lubricant of the structure as described below where the perfluoropolyether chain was bonded to only one terminal of an ammonium carboxylate having an aromatic ring, and subjected to the identical evaluation to that in Example 2.

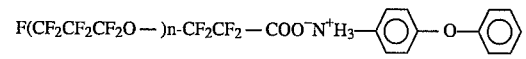

[11]

Comparative Example 4

Example 1 was repeated with DEMNUM SH-1 available from DAIKIN Co. to synthesize a fluorine-containing compound having Rf of an average molecular weight of 2100 and the same evaluation as in the Example was conducted.

The results of the evaluations of the Comparative Examples 1 to 4 as described above are set forth in Table 2.

As can be seen from the Table 2, the lubricants according to the present invention have excellent characteristics that they exhibit less amounts of evaporation and volatilization thereof and that they are considerably lower in coefficient of friction and in frictional force after 3000 cycles of CSS.

The lubricants comprising a multifunctional ammonium carboxylate according to the present invention can be applied to magnetic recording media to form films having excellent lubricating characteristics on the surfaces thereof so that there can be provided such high density magnetic recording media as maintaining excellent lubricating performance even in high temperature environments and having excellent durability under sliding movement and reliability.

What is claimed is:

1. A lubricant characterized by containing a multifunctional ammonium carboxylate represented by the general formula (1):

$$(Rf-COO^-)n(H-\underset{R^2}{\overset{R^1}{\underset{|}{N^+}}})n-R \tag{1}$$

where n is an integer of 2 to 4, Rf represents a non-branched, linear perfluoropolyether chain having an average molecular weight of 3000 to 10000, $R^1$ and $R^2$ represent hydrogen or an alkyl group, R represents an organic group of two to four valences having one or more aromatic rings.

2. The lubricant according to claim 1, wherein the R in the general formula (1) is a phenylether organic group.

3. The lubricant according to claim 1, wherein the R in the general formula (1) is represented by the general formula (2):

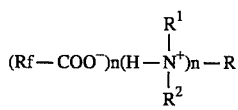

(2)

4. The lubricant according to claim 1, wherein the R in the general formula (1) is represented by the general formula (3):

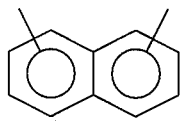

(3)

5. The lubricant according to claim 1, wherein the R in the general formula (1) is represented by the general formula (4):

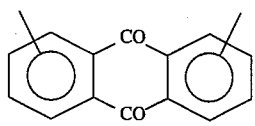

(4)

wherein $X^1$, $X^2$ represent hydrogen or a methyl group, and Y represents a bond or —O—, —S—, —S—S—, —SO$_2$—, —CH$_2$—, —CH$_2$CH$_2$—, —CO—, —C(CH$_3$)$_2$—, —C(CF$_3$)$_2$—, —CO—CO—, —O—C$_6$H$_4$—O—, —C(CH$_3$)$_2$—C$_6$H$_4$—C(CH$_3$)$_2$—, —O—C$_6$H$_4$—SO$_2$—C$_6$H$_4$—O—, —O—C$_6$H$_4$—C(CH$_3$)$_2$—C$_6$H$_4$—O—, —O—C$_6$H$_4$—C$_6$H$_4$—O—, or —O—C$_6$H$_4$—C(CF$_3$)$_2$—C$_6$H$_4$—O—.

6. The lubricant according to any one of claims 1 to 5, wherein the Rf in the general formula (1) is represented by the general formula (5):

$$F(C_3F_6O)m-C_2F_4- \tag{5}$$

where m is an integer.

7. A magnetic recording medium comprising a non-magnetic support having a magnetic layer thereon, on the top of which a protective film is formed, characterized by having on said protected film a lubricant film containing a multifunctional ammonium carboxylate represented by the general formula (1):

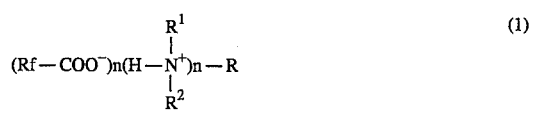

where n is an integer of 2 to 4, Rf represents a non-branched, linear perfluoropolyether chain having an average molecular weight of 3000 to 10000, $R^1$ $R^2$ and represent hydrogen or an alkyl group, R represents an organic group of two to four valences having one or more aromatic rings.

8. The magnetic recording medium according to claim 7, wherein said protective film is a carbon based protective film.

9. The magnetic recording medium according to claim 7, wherein the R in the general formula (1) is a phenylether organic group.

10. The magnetic recording medium according to claim 7, wherein the R in the general formula (1) is represented by the general formula (2):

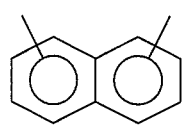

[2]

11. The magnetic recording medium according to claim 7, wherein the R in the general formula (1) is represented by the general formula (3):

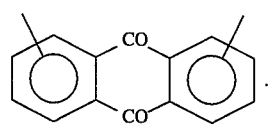

(3)

12. The magnetic recording medium according to claim 7, wherein the R in the general formula (1) is represented by the general formula (4):

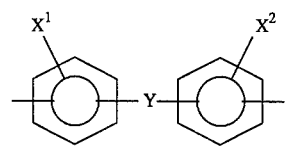

(4)

where $X^1$ and $X^2$ represent hydrogen or a methyl group, and Y represents a bond or —O—, —S—, —S—S—, —SO$_2$—, —CH$_2$—, —CH$_2$CH$_2$—, —CO—, —C(CH$_3$)$_2$—, —C(CF$_3$)$_2$—, —CO—CO—, —O—C$_6$H$_4$—O—, —C(CH$_3$)$_2$—C$_6$H$_4$—C(CH$_3$)$_2$—, —O— C$_6$H$_4$—SO$_2$—C$_6$H$_4$—O—, —O—C$_6$H$_4$—C(CH$_3$)$_2$—C$_6$H$_4$—O—, —O—C$_6$H$_4$—C$_6$H$_4$ —O—, or —O—C$_6$H$_4$—C(CF$_3$)$_2$—C$_6$H$_4$—O—.

13. The magnetic recording medium according to any one of claims 7 to 12, wherein the Rf in the general formula (1) is represented by the general formula (5):

$$F(C_3F_6O)_m-C_2F_4- \quad (5)$$

where m is an integer.

14. The magnetic recording medium according to claim 13, wherein said lubricant film containing a multifunctional ammonium carboxylate represented by the general formula (1) has a film thickness of 3 to 20 nm.

* * * * *